United States Patent
Chen et al.

(10) Patent No.: US 6,594,743 B1
(45) Date of Patent: Jul. 15, 2003

(54) DISK-CLONING METHOD AND SYSTEM FOR CLONING COMPUTER DATA FROM SOURCE DISK TO TARGET DISK

(75) Inventors: Tong S. Chen, Taipei (TW); Kuang Shin Lin, Taipei (TW); Yong Jun Shi, Tien Chin (CN)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/571,119

(22) Filed: May 12, 2000

(30) Foreign Application Priority Data

May 15, 1999 (TW) ........................................ 88107914 A

(51) Int. Cl.[7] .............................................. G06F 12/00
(52) U.S. Cl. ........................... 711/162; 360/15; 360/55; 360/131; 369/84; 711/111; 711/147; 711/154
(58) Field of Search ........................... 360/15, 55, 131; 369/84; 711/111, 112, 114, 147, 154, 161, 162

(56) References Cited

U.S. PATENT DOCUMENTS 5,438,671 A  *  8/1995 Miles ....................... 709/247
5,881,038 A  *  3/1999 Oshima et al. ........... 369/47.12
6,185,666 B1 *  2/2001 Murray et al. ............... 711/173
2002/0107877 A1 *  8/2002 Whiting ...................... 707/204

* cited by examiner

Primary Examiner—Do Hyun Yoo
Assistant Examiner—C. P. Chace
(74) Attorney, Agent, or Firm—Peter F. Corless; Steven M. Jensen; Edwards & Angell, LLP

(57) ABSTRACT

A disk-cloning method and system is provided for cloning computer data from a source disk to a target disk. This disk-cloning method and system can be utilized, for example, in the computer assembly line to clone a preselected set of software programs to the main hard disk of each computer unit, or as a backup to a hard disk. This disk-cloning method and system is characterized in that the source data are read from the source disk and written onto the target disk in a sector-by-sector manner rather than in a file-by-file manner as the prior art. This feature allows the cloning procedure to be more efficiently carried out than the prior art. Moreover, it allows the disk-cloning procedure to be performed without having to make modifications to the existing FDT (File Directory Table) and FAT (File Allocation Table) on the target disk, thus ensuring the system security of the target disk. This disk-cloning method and system is therefore more reliable and efficient to use than the prior art.

8 Claims, 5 Drawing Sheets

DISK-CLONING METHOD AND SYSTEM FOR CLONING COMPUTER DATA FROM SOURCE DISK TO TARGET DISK

BACKGROUND OF THE INVENTION

1. Field of the Invention

This invention pertains to information technology, and more particularly, to a disk-cloning method and system for cloning computer data from a source disk to a target disk, which can be utilized, for example, in the computer assembly line to clone a preselected set of software programs to the main hard disk of each computer unit, or as a backup utility to data storage means.

2. Description of Related Art

Personal computers, such as Wintel-based PCs, are typically bundled with preinstalled operating system and application programs, such as Microsoft Windows 98 and Office 97, for the purpose of promoting sales. Normally, Windows 98 & Office 97 can be installed onto a PC's hard disk using their included setup programs. In the PC factory, however, using the setup program to preinstall Windows 98 & Office 97 onto each PC unit would be extremely laborious and time-consuming to carry out, because the total time required to complete the installation of Windows 98 would be typically from 30 to 60 minutes.

One solution to the foregoing problem is to install Windows 98 & Office 97 (hereinafter referred to as source data) onto a hard disk (hereinafter referred to as source disk), then compress the installed files on the source disk as an image file, and then clone the compressed file through decompression onto to the hard disk of each PC unit (hereinafter referred to as target disk). This disk-cloning method allows Windows 98 & Office 97 to be more quickly installed to each PC unit than using setup programs. In addition, in the event that Windows 98 & Office 97 on a hard disk is damaged, the image file can serve as a backup for recovery of the original Windows 98 & Office 97 files to the hard disk.

FIG. 1 is a schematic diagram showing the module configuration for a conventional disk-cloning method and system. As shown, the disk-cloning method and system is used to clone a set of software programs, such as Windows 98 & Office 97, from a source disk 10 to a target disk 20. In the first step, the disk-cloning method and system utilizes a source-disk read module 11 to read all the files stored on the source disk 10 in a file-by-file manner (these files are denoted respectively by FILE_1, FILE_2, . . . , and FILE_N and are collectively designated by the reference numeral 12 in FIG. 1). These files FILE_1, FILE_2, . . . , and FIEL_N are then compressed by a compression module 13 into an image file 14. After this, a decompression module 21 is used to decompress the image file 14 to recover the primitive data form of the original files FILE_1, FILE_2, . . . , and FIEL_N read from the source disk 10. The decompressed data are then written by a target-disk read/write module 22 in a file-by-file manner onto the target disk 20.

Using the prior art of FIG. 1, the cloning of 1 GB (gigabyte) of source data from the source disk 10 to the target disk 20 would require about 10 minutes and 26 seconds to complete.

The foregoing disk-cloning method and system however, is considered complicated in process, poor in system security, and slow in efficiency. These drawbacks arise due to the fact that the source-disk read procedure needs to look up the entire FDT (File Directory Table) and FAT (File Allocation Table) on the source disk to read all the files from the source disk, which takes much time to complete. Moreover, during the target-disk write procedure, it is required to modify the FDT and FAT on the target disk, which also takes much time to complete. Moreover, in the case of the target disk being different in capacity from the source disk, the modifications to FAT and FDT would be even more time-consuming to complete, and the system security of the target disk can be affected.

SUMMARY OF THE INVENTION

It is therefore an objective of this invention to provide a new disk-cloning method and system, which allows a faster cloning speed than the prior art.

It is another objective of this invention to provide a new disk-cloning method and system, which requires no modifications to the FDT and FAT of the target disk so that the system security of the target disk can be ensured.

It is still another objective of this invention to provide a new disk-cloning method and system, which allows a fast cloning speed even in the case of the source and target disks being different in capacity.

In accordance with the foregoing and other objectives of this invention, a new disk-cloning method and system is proposed. The invention is characterized in that the source data are cloned in a sector-by-sector manner rather than in a file-by-file manner as the prior art. This feature allows the cloning procedure to be more efficiently carried out than the prior art. Moreover, it allows the disk-cloning procedure to be performed without having to make modifications to the existing FDT and FAT on the target disk, thus ensuring the system security of the target disk.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
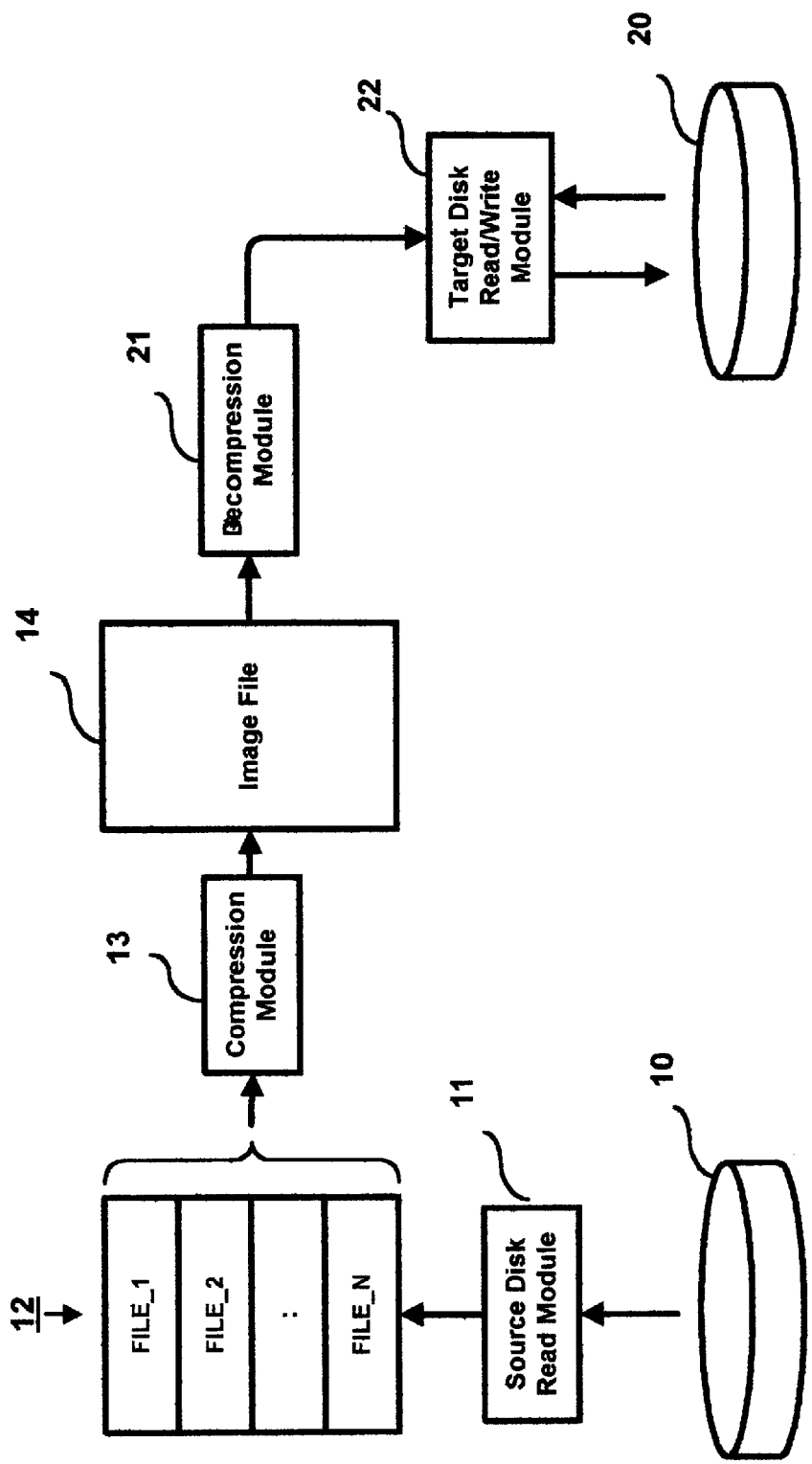
FIG. 1 (PRIOR ART) is a schematic diagram showing the module configuration of a conventional disk-cloning method and system.
Figure 2:
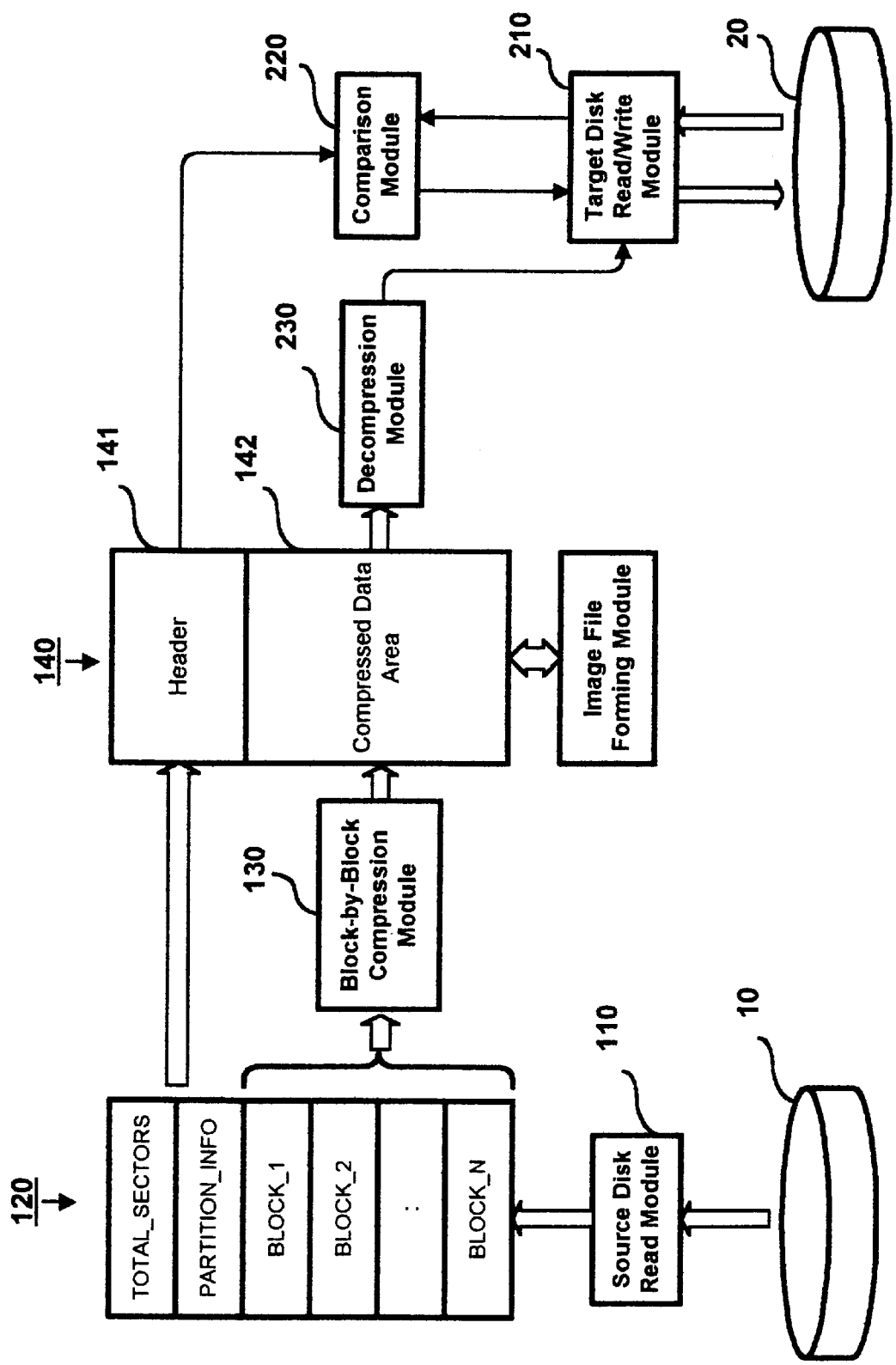
FIG. 2 is a schematic diagram showing the module architecture of the disk-cloning method and system according to the invention.
Figure 3:
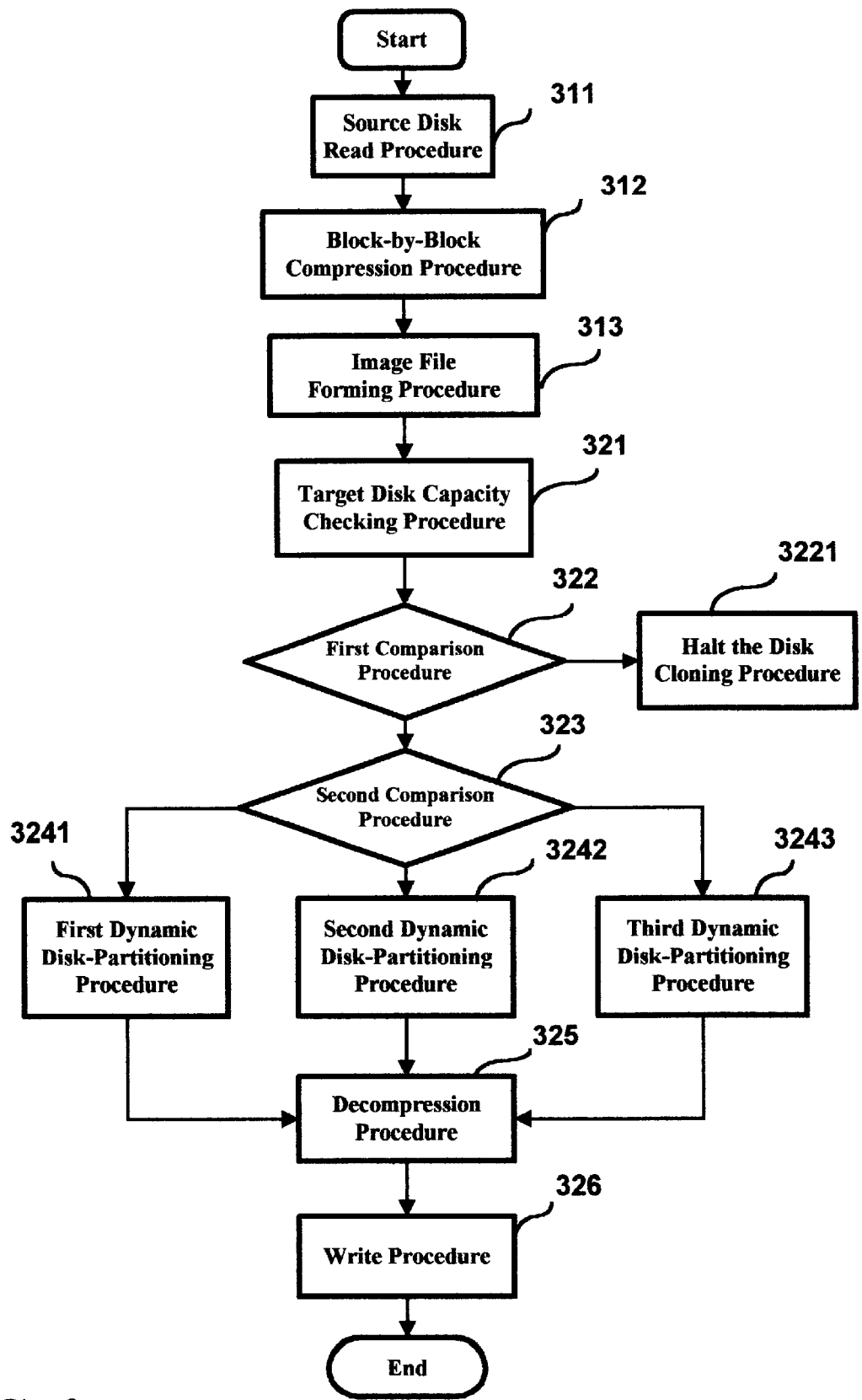
FIG. 3 is a flow diagram showing the procedural steps performed by the disk-cloning method and system of the invention.

FIG. 2 is a schematic diagram showing the module architecture of the disk-cloning method and system of the invention; and FIG. 3 is a flow diagram showing the procedural steps performed by the same. In the following embodiment, the target disk is, for example, the main hard disk of a PC unit. However, it is to be noted that, broadly speaking, the target disk can be any various other type of data storage means, such as optical disc.

As shown in FIG. 2, the disk-cloning method and system of the invention is used to clone a set of software programs (hereinafter referred to as source data) from a source disk 10 to a target disk 20. The software programs can be, for example, Windows 98 & Office 97, which are to be cloned to the main hard disk (i.e., the target disk 20) of each PC unit in the assembly line.

Referring to FIG. 3 together with FIG. 2, in the first step 311, the invention utilizes a source-disk read module 110 to perform a source-disk read procedure on the source disk 10 to read the source data together with a set of storage parameters from the source disk 10. The storage parameters include the total amount of used sectors on the source disk 10 (denoted by TOTAL_SECTORS) and the partition information about how the source disk 10 is partitioned (denoted by PARTITION_INFO). The TOTAL_SECTORS parameter indicates the total amount of the source data stored on the source disk 10; while the PARTITION_INFO parameter indicates the number of partitions and the size of each partition on the source disk 10.

The invention is characterized in that the source-disk read procedure reads the source data from the source disk 10 in a sector-by-sector manner rather than a file-by-file manner as the prior art. Moreover, this sector-by-sector read procedure is performed only on those sectors that store the source data (called used sectors) while skipping unused ones, so that the total data amount can be reduced to the minimum for efficient handling. For example, in the case of the source disk 10 being 2.5 GB in capacity and the total amount of source data is 1 GB, then the read procedure should be directed to these 1 GB of source data only. This can be achieved by looking up the FAT on the source disk 10 to find all the clusters where the source data are stored, and then use the cluster numbers to locate all the used sectors. The read procedure is then directly only to these used sectors.

Next, the read procedure organizes the retrieved sectors of data from the source disk 10 into a set of blocks of a predetermined equal length, as denoted respectively by BLOCK_1, BLOCK_2, ..., and BLOCK_N in FIG. 2. The block length can be arbitrarily assigned by the designer.

In the next step 312, the invention utilizes a block-by-block compression module 130 to perform a non-destructive compression procedure on the data blocks BLOCK_1, BLOCK_2, ..., and BLOCK_N in a block-by-block manner. Typically, a non-destructive compression algorithm can compress 1 GB of source data into 0.5 GB.

In the next step 313, the invention utilizes an image-file forming module to perform an image-file forming procedure to form an image file 140 including a header 141 and a compressed-data section 142, wherein the header 141 is used to store the TOTAL_SECTORS and PARTITION_INFO parameters, while the compressed-data section 142 is used to store the compressed data from the compression module 130.

In the next step 321, the invention performs a target-disk capacity checking procedure through a target-disk read/write module 210 to check the target disk 20 for its capacity.

In the next step 322, the invention utilizes a comparison module 220 to perform a first comparison procedure to check whether the capacity of the target disk 20 is equal to or greater than the total amount of the original source data on the source disk 10 (this information is indicated by the TOTAL_SECTORS parameter stored in the header 141 of the image file 140). If NO, it indicates that the target disk 20 is insufficient in capacity to hold all the source data from the source disk 10, and therefore, the procedure goes to the step 3221, in which the disk-cloning procedure is halted and a message is displayed to inform the operator of such a condition. Otherwise, if YES, the procedure goes to the step 323.

In the step 323, the invention utilizes the comparison module 220 to perform a second comparison procedure to check whether the capacity of the target disk 20 is equal to, less than, or greater than the capacity of the source disk 10. If the result is EQUAL, the procedure goes to the step 3241; if LESS THAN, the procedure goes to the step 3242; and if GREATER THAN, the procedure goes to the step 3243.

In the description of the subsequent steps, the following notations are used:

n denotes the number of partitions on the source disk 10;

$NS[i]$, i=1 to n, denotes the amount of source data stored on the (i)th partition on the source disk 10; and $MS[i]$ denotes the number of sectors on the largest partition on the source disk 10, which is equal to $2^A * 8 *$ [Number of Sectors per Cluster], where A denotes the number of bits used to access each cluster;

$RS0[i]$, i=1 to n, denotes the initial value assigned to the (i)th partition on the target disk 20 before partitioning the target disk 20; and $RS[i]$, i=1 to n, denotes the finalized size of the (i)th partition on the target disk 20 that will be used to partition the target disk 20.

(Case-1)

In the case of the target disk 20 being equal in capacity to the source disk 10, the disk-cloning procedure goes to the step 3241, in which the invention performs a first dynamic disk-partition procedure through the read/write module 210 on the target disk 20, which partitions the target disk 20 entirely in the same manner as the source disk 10 (this information is indicated by the PARTITION_INFO parameter stored in the header 141 of the image file 140). In other words, the number of partitions and the size of each partition on the target disk 20 are all exactly the same as the source disk 10.

(Case-2)

In the case of the target disk 20 being less in capacity than the source disk 10, the disk-cloning procedure goes to the step 3242, in which the invention performs a second dynamic disk-partition procedure through the read/write module 210 on the target disk 20. The second dynamic disk-partition procedure partitions the target disk 20 into the same number of partitions as the source disk 10, with the excessive disk space of the target disk 20 being allocated to the partitions in a predetermined order. Detailed steps of the second dynamic disk-partition procedure are shown in FIG. 4, and one example thereof is illustrated in FIG. 5.

Figure 4:
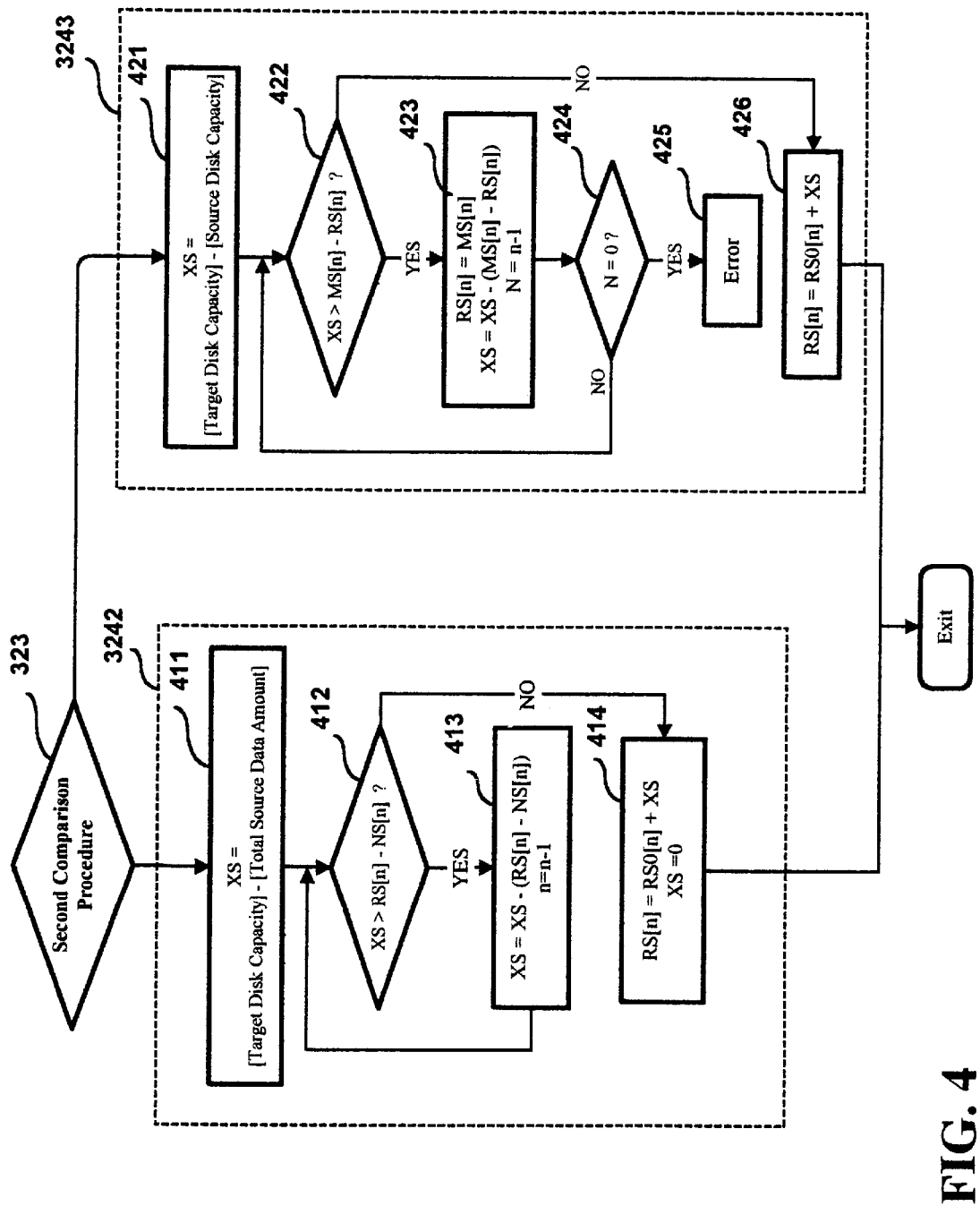
FIG. 4 is a flow diagram showing more detailed substeps in two procedural steps in the flow diagram of FIG. 3.
Figure 5:
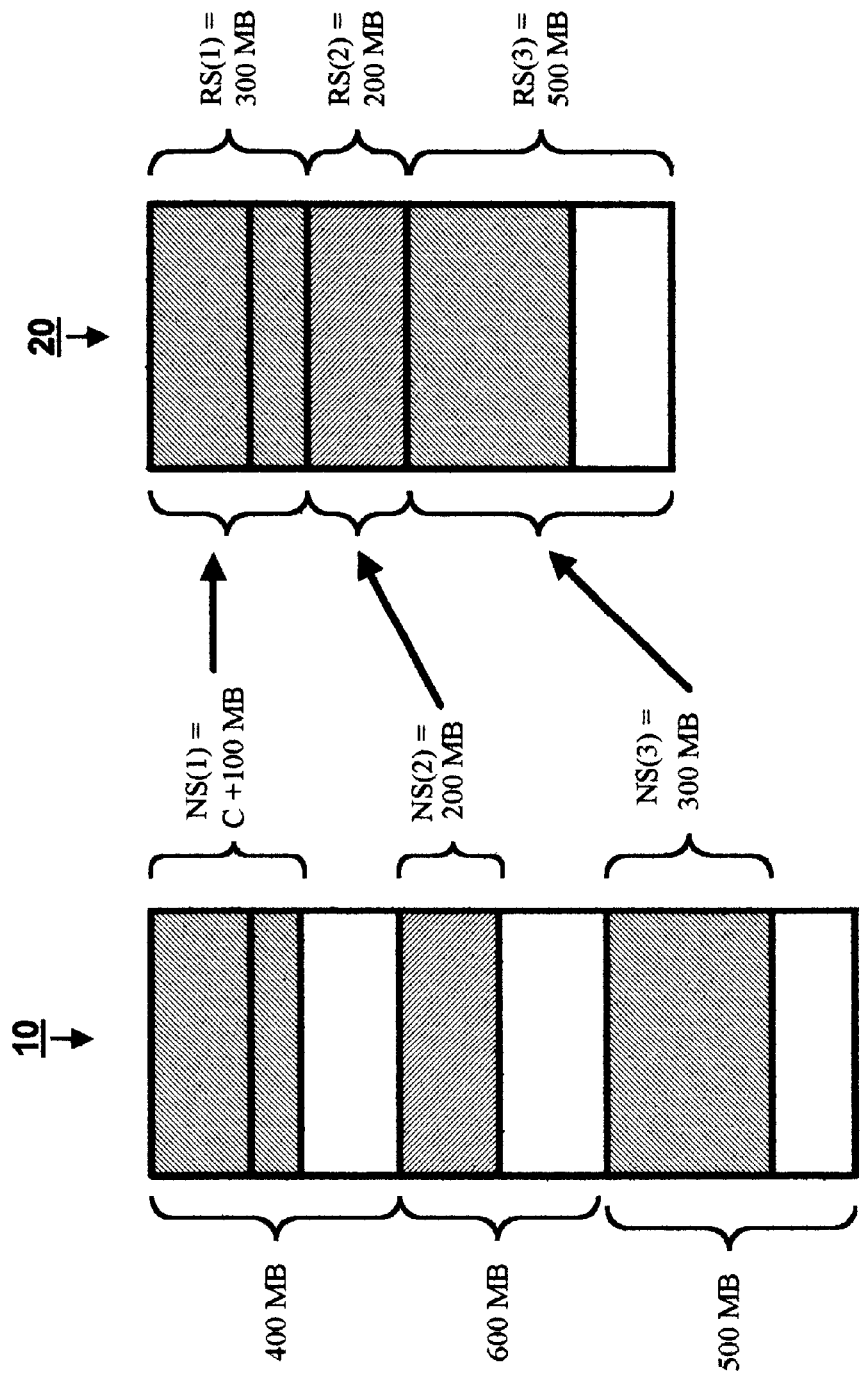
FIG. 5 is a schematic diagram used to depict an example of the partition scheme on the target disk performed by the disk-cloning method and system of the invention.

Referring to FIG. 4, in the first step 411 in this procedure, the invention performs the following computation to obtain the excessive disk space XS of the target disk 20:

$XS$=[Target Disk Capacity]−[Total Source Data Amount]

where $$[Total\ Source\ Data\ Amount] = \sum_{n=1}^{n} NS[i]$$

In the next step 412, the invention checks whether the following expression is true or false:

$XS > RS[n] - NS[n]?$

If YES, the procedure goes to the step 413; otherwise, if NO, the procedure goes to the step 414.

In the step 413, the invention performs the following computations:

$$XS=XS-(RS[n]-NS[n])$$

$$n=n-1$$

if n≠0, go to step 412; otherwise, exit the second dynamic disk-partition procedure.

In the next step 414, the invention performs the following assignment repeatedly until XS=0 (i.e., the excessive disk space on the target disk are all assigned to the partitions of the target disk 20):

$$RS[n]=RS0[n]+XS$$

FIG. 5 is a schematic diagram used to depict an example of the second dynamic disk-partition procedure 3242 performed by the disk-cloning method and system of the invention. In this example, assume the source disk 10 has a capacity of 1.5 GB and is partitioned into three partitions (i.e., n=3), which are respectively 400 MB, 600 MB, and 500 MB in size, and which are respectively loaded with 100 MB, 200 MB, and 300 MB of source data; and the target disk 20 has a capacity of 1 GB, which is less than the source disk 10.

Further assume that NS[i], i=1, 2, 3 denotes the amount of data stored on the (n)th partition on the source disk 10, then $$NS[1]=100 \text{ MB}+C$$

$$NS[2]=200 \text{ MB}$$

$$NS[3]=300 \text{ MB}$$

where

C represents the total amount of the boot information and virtual memory space on the primary partition (i.e., the NS[1] partition) on the source disk 10. For simplification of computation, this amount is rounded up to the nearest multiple of 100 MB. For example, if the actual amount is 90 MB, C=100 MB is used; and if 130 MB, C=200 MB is used.

In this example, assume C=200 MB is used (i.e., NS[1]= 100 MB+200 MB=300 MB). Then, since the total amount of source data on the source disk 10 is NS[1]+NS[2]+NS[3]= 300 MB+200 MB+300 MB=800 MB, which is less than the target disk capacity of 1 GB, the target disk 20 is sufficient to hold all the source data from the source disk 10 Moreover, the excessive disk space XS of the target disk 20 can be obtained as follows:

$$XS=1 \text{ GB}=(NS[1]+NS[2]+NS[3])$$

$$=1 \text{ GB}=(300 \text{ MB}+200 \text{ MB}+300 \text{ MB})$$

$$=200 \text{ MB}$$

Assume RS[i], i=1, 2, 3 denotes the size of the (i)th partition on the target disk 20 that will be used to partition the target disk 20. Then, as minimum requirement, $$RS[1] \geq NS[1]$$

$$RS[2] \geq NS[2]$$

$$RS[3] \geq NS[3]$$

In accordance with the invention, the excessive disk space XS is allocated in a reverse order from the last partition to the first partition until it is entirely allocated. More specifically, the second dynamic disk-partition procedure first allocates the excessive disk space XS to the last partition (in this example, the 3rd partition) until all is allocated or until reaching the maximum allowable partition size; if reaching the maximum allowable partition size, the remaining part of the excessive disk space XS will be allocated to the next higher partition (in this example, the 2nd partition); and so forth until all of the excessive disk space XS is allocated.

In this example, assume that the excessive disk space XS can be entirely allocated to the last partition, i.e., RS[3], without exceeding the maximum allowable partition size; therefore, $$RS[1]=300 \text{ MB}$$

$$RS[2]=200 \text{ MB}$$

$$RS[3]=300 \text{ MB}+200 \text{ MB}=500 \text{ MB}$$

Accordingly, the target disk 20 is partitioned into three partitions, which are respectively 300 MB, 200 MB, and 500 MB in size.

(Case-3)

In the case of the target disk 20 being greater in capacity than the source disk 10, the disk-cloning procedure goes to the step 3243, in which the invention performs a third dynamic disk-partition procedure through the read/write module 210 on the target disk 20. The third dynamic disk-partition procedure is performed substantially in the same manner as the second one, which also partitions the target disk 20 into the same number of partitions as the source disk 10, with the excessive disk space of the target disk 20 being allocated to the partitions in a predetermined order. Detailed steps of the third dynamic disk-partition procedure are shown in FIG. 4.

As shown, in the first step 421, the invention performs the following computation:

$$XS \text{ [Target Disk Capacity]}-\text{[Source Disk Capacity]}$$

In the next step 422, the invention checks whether the following expression is true or false:

$$XS>MS[n]-RS[n]?$$

If YES, the procedure goes to the step 423; otherwise, if NO, the procedure goes to the step 426.

In the step 423, the invention performs the following computations:

$$RS[n]=MS[n])$$

$$XS=XS-(MS[n]-RS[n])$$

$$N=n-1$$

In the next step 424, the invention checks whether N=0 or not. If YES, the procedure goes to the step 425; otherwise, if NO, the procedure goes back to the step 422.

In the step 425, an error message is generated.

In the step 426, the invention performs the following assignment repeatedly until XS=0 (i.e., the excessive disk space on the target disk are all assigned to the partitions of the target disk 20):

$$RS[n]=RS0[n]+XS$$

This completes the third dynamic disk-partition procedure. The target disk 20 is then partitioned in accordance with the finally resulted RS[i], for i=1 to n.

After the partitioning of the target disk 20 is completed, the procedure then goes to the step 325, in which the invention performs a decompression process to decompress the data stored in the compressed-data section 142 of the image file 140.

In the next step 326, the invention performs a write procedure through the read/write module 210 to write the decompressed data from the decompression module 230 in a sector-by-sector and partition-to-partition manner onto the target disk 20. This completes the disk-cloning procedure.

Alternatively, the invention can be embodied with less complexity in procedure provided that the target disk 20 can be selected in advance to have exactly the same capacity as the source disk 10. By this embodiment, the steps 321, 322, and 323 would be unnecessary, and thus can be eliminated. In this case, the disk-cloning procedure will partition the target disk 20 exactly in the same manner as the source disk 10 based on the PARTITION_INFO parameter stored in the header 141 of the image file 140.

CONCLUSION

In conclusion, the invention provides a new disk-cloning method and system, which is characterized in that the source data are read from the source disk and written onto the target disk both in a sector-by-sector manner rather than in a file-by-file manner as the prior art. This allows the disk-cloning procedure to be performed without having to make modifications to the existing FDT and FAT on the target disk, thus ensuring the system security of the target disk. By the invention, it requires only about 8 minutes and 20 seconds to clone 1 GB of source data from the source disk to the target disk, which is better than the prior art which requires about 10 minutes and 26 seconds to complete. The invention is therefore more reliable and efficient to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A disk-cloning method for cloning source data from a source disk to a target disk, comprising the steps of:
   (1) starting a disk-cloning procedure;
   (2) performing a source-disk read procedure to read the source data in a sector-by-sector manner from the source disk together with the partition information and total sector information from the source disk;
   (3) performing a block-by-block compression procedure to compress the source data into compressed data;
   (4) performing an image-file forming procedure to form an image file including a header and a compressed-data section, with the header being used for storing the partition information and total sector information and the compressed-data section being used for storing the block-by-block compressed data;
   (5) performing a target-disk capacity checking procedure to check for the capacity of the target disk;
   (6) performing a first comparison procedure to check that whether the target disk capacity is equal to or greater than the total amount of source data on the source disk indicated by the total sector information stored in the header of the image file;
   if NOT, ending the disk-cloning procedure;
   (7) performing a second comparison procedure to compare the target disk capacity with the source disk capacity;
   (7-1) if the target disk capacity is equal to the source disk capacity, performing a first dynamic disk-partition procedure, which partitions the target disk entirely in the same manner as the source disk;
   (7-2) if the target disk capacity is less than the source disk capacity, performing a second dynamic disk-partition procedure, which partitions the target disk into the same number of partitions as the source disk, with the excessive disk space of the target disk being allocated to the partitions in a predetermined order;
   (7-3) if the target disk capacity is greater than the source disk capacity, performing a third dynamic disk-partition procedure, which partitions the target disk into the same number of partitions as the source disk, with the excessive disk space of the target disk being allocated to the partitions in a predetermined order;
   (8) performing a decompression procedure to decompress the compressed data stored in the compressed-data section of the image file; and
   (9) performing a write procedure to write the decompressed data in a sector-by-sector and partition-to-partition manner onto the target disk.

2. The disk-cloning method of claim 1, wherein the source-disk read procedure includes the substeps of:
   looking up the FAT of the source disk to find all the cluster numbers indicative of the clusters on the source disk where the source data are stored;
   from the cluster numbers, obtaining all the used sectors where the source data are located; and
   reading the data stored on these used sectors.

3. The disk-cloning method of claim 1, wherein the second dynamic disk-partition procedure allocates the excessive disk space of the target disk in such a manner that the excessive disk space is first allocated to the last partition until all is allocated or until reaching the maximum allowable partition size; and if reaching the maximum allowable partition size, the remaining part of the excessive disk space is allocated to the next-higher partition; and so forth until all of the excessive disk space is allocated.

4. A disk-cloning method for cloning source data from a source disk to a target disk, where the target disk is equal in capacity to the source disk;
   the disk-cloning method comprising the steps of:
   (1) starting a disk-cloning procedure;
   (2) performing a source-disk read procedure to read the source data in a sector-by-sector manner from the source disk together with the partition information and total sector information from the source disk;
   (3) performing a block-by-block compression procedure to compress the source data into compressed data;
   (4) performing an image-file forming procedure to form an image file including a header and a compressed-data section, with the header being used for storing the partition information and total sector information and the compressed-data section being used for storing the block-by-block compressed data;
   (5) based on the partition information stored in the header of the image file, partitioning the target disk in the same manner as the source disk;
   (6) performing a decompression procedure to decompress the compressed data stored in the compressed-data section of the image file; and (7) performing a write procedure to write the decompressed data in a sector-by-sector and partition-to-partition manner onto the target disk.

5. The disk-cloning method of claim 4, wherein the source-disk read procedure includes the substeps of:

looking up the FAT of the source disk to find all the cluster numbers indicative of the clusters on the source disk where the source data are stored;

from the cluster numbers, obtaining all the used sectors where the source data are located; and reading the data stored on these used sectors.

6. A disk-cloning system for cloning computer data from a source disk to a target disk, which comprises:

(a) a source-disk read module for reading the source data in a sector-by-sector manner from the source disk together with the partition information and total sector information from the source disk, with the retrieved sectors of source data being organized into a set of blocks;

(b) a compression module for compressing the source data in a block-by-block manner into compressed data;

(c) an image-file forming module for forming an image file including a header and a compressed-data section, with the header being used for storing the partition information and total sector information and the compressed-data section being used for storing the block-by-block compressed data;

(d) means for checking the capacity of the target disk;

(e) means for partitioning the target disk;

(f) a comparison module capable of performing a first comparison procedure and a second comparison procedure; wherein the first comparison procedure is performed to check that whether the target disk capacity is equal to or greater than the total amount of source data on the source disk indicated by the total sector information stored in the header of the image file; if NOT, the comparison module actuates the ending of the disk-cloning procedure; and the second comparison procedure is performed to compare the target disk capacity with the source disk capacity in such a manner that:

if the target disk capacity is equal to the source disk capacity, the comparison module actuates the partitioning means to perform a first dynamic disk-partition procedure to partition the target disk entirely in the same manner as the source disk;

if the target disk capacity is less than the source disk capacity, the comparison module actuates the partitioning means to perform a second dynamic disk-partition procedure to partition the target disk into the same number of partitions as the source disk, with the excessive disk space of the target disk being allocated to the partitions in a predetermined order;

if the target disk capacity is greater than the source disk capacity, the comparison module actuates the partitioning means to perform a third dynamic disk-partition procedure to partition the target disk into the same number of partitions as the source disk, with the excessive disk space of the target disk being allocated to the partitions in a predetermined order;

(g) a decompression module for decompressing the compressed data stored in the compressed-data section of the image file; and (h) a target-disk read/write module for writing the decompressed data in a sector-by-sector and partition-to-partition manner onto the target disk.

7. The disk-cloning system of claim 6, wherein the source-disk read procedure includes the substeps of:

looking up the FAT of the source disk to find all the cluster numbers indicative of the clusters on the source disk where the source data are stored;

from the cluster numbers, obtaining all the used sectors where the source data are located; and reading the data stored on these used sectors.

8. The disk-cloning system of claim 7, wherein the second dynamic disk-partition procedure allocates the excessive disk space of the target disk in such a manner that the excessive disk space is first allocated to the last partition until all is allocated or until reaching the maximum allowable partition size; and if reaching the maximum allowable partition size, the remaining part of the excessive disk space is allocated to the next-higher partition; and so forth until all of the excessive disk space is allocated.

* * * * *